United States Patent [19]
Duffert

[11] 3,825,783
[45] July 23, 1974

[54] CONDUCTOR BAR FOR ELECTRICAL MACHINES

[75] Inventor: Heinrich Duffert, Mulheim/Ruhr, Germany

[73] Assignee: Kraftwerk Union Aktiengesellschaft, Mulheim (Ruhr), Germany

[22] Filed: Aug. 30, 1972

[21] Appl. No.: 284,866

[30] Foreign Application Priority Data
Sept. 3, 1971  Germany............................ 2144131

[52] U.S. Cl. ............................................. 310/213
[51] Int. Cl. ............................................. H02k 3/14
[58] Field of Search ...................... 310/179, 213, 64

[56] References Cited
UNITED STATES PATENTS

| | | | |
|---|---|---|---|
| 2,821,641 | 1/1958 | Ringland | 310/213 |
| 3,214,617 | 10/1965 | Tudge | 310/213 |
| 3,280,244 | 10/1966 | Pannen | 310/213 |
| 3,469,125 | 9/1969 | Kranz | 310/64 |
| 3,647,932 | 3/1972 | Heller | 310/213 |
| R27,489 | 9/1972 | Brenner | 310/213 |

FOREIGN PATENTS OR APPLICATIONS

| | | | |
|---|---|---|---|
| 635,116 | 7/1963 | Belgium | 310/213 |
| 1,144,386 | 2/1963 | Germany | 310/213 |

*Primary Examiner*—R. Skudy
*Attorney, Agent, or Firm*—Herbert L. Lerner

[57] ABSTRACT

Conductor bar for insertion into a core notch of an electrical machine, includes partial conductors disposed in three longitudinally extending planes, the partial conductors being twisted together, and, to compensate for radial and tangential stray fields at overhanging end portions of the bars as well as for core notch transverse field, the number of partial conductors for each of the planes being uneven, the partial conductors of the outer planes having a twist of 90° over an initial sixth of the length thereof, a twist of 180° over the succeeding second to fifth sixths thereof and a twist of 90° over the sixth sixth thereof, and being alternatingly stranded together in the middle plane, and the partial conductors of the inner plane in the initial sixth, the second to fifth sixth and the sixth sixth of the length thereof having a doubled twist of 180°, 360° and 180°, respectively.

1 Claim, 6 Drawing Figures

PATENTED JUL 23 1974  3,825,783
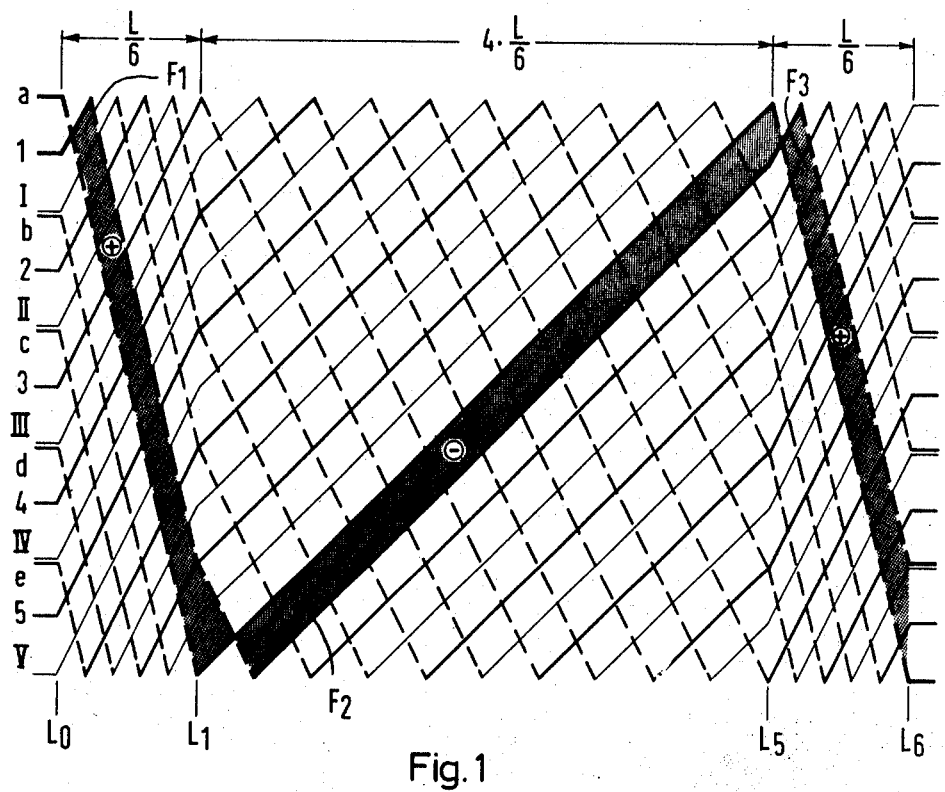
Fig. 1
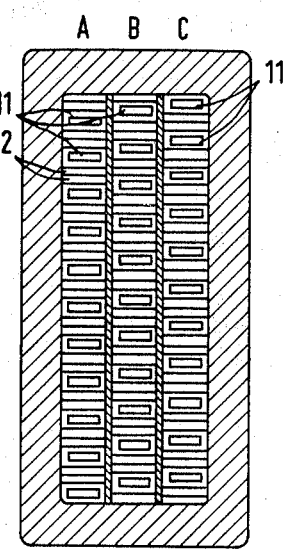
| A | B | C |
|---|---|---|
| 1 | a | I |
| 2 | b | II |
| 3 | c | III |
| 4 | d | IV |
| 5 | e | V |
0°
$L_0$
Fig. 2
| A | B | C |
|---|---|---|
| 4 | 3 | III |
| 5 | II | IV |
| e | 2 | V |
| c | I | d |
| a | 1 | b |
90°–180°
$L_1$
Fig. 3
| A | B | C |
|---|---|---|
| I | a | 1 |
| II | b | 2 |
| III | c | 3 |
| IV | d | 4 |
| V | e | 5 |
360°
$L_5$
Fig. 4
| A | B | C |
|---|---|---|
| III | 3 | 4 |
| IV | II | 5 |
| V | 2 | e |
| d | I | c |
| b | I | a |
450°–540°
$L_6$
Fig. 5
Fig. 6

CONDUCTOR BAR FOR ELECTRICAL MACHINES

The invention relates to conductor bars for electrical machines, especially for turbogenerators, and more particularly to such conductor bars having partial conductors disposed in three planes and twisted together.

In conventional coil conductors of electrical machines, eddy current losses occur which are produced by stray or scattered flux that is linked to the conductor. This is particularly true, for the transverse flux of the core slot, into which the conductor is insertable. The slot transverse flux traversing that part of the conductor which is located in the laminated core packet. It is also true for the overhang stray flux which is formed in the overhang winding of the conductor which extends outside of the laminated core packet.

To compensate for these losses, it has been known heretofore, in the case of a three-plane bar, to give the partial conductors a twist of 360° over the entire length of the core slot, whereby the partial conductors successively assume all positions within the conductor or the core slot. In a conductor twisted in such a way, the voltages that are in fact induced by the core slot transverse field and by the radial stray field at the overhanging end portions or windings are equal in the individual partial conductors so that no transient or equalizing currents can flow. Compensation of the tangential stray fields at the overhang windings of the conductors, which are stronger than the radial field in large machines because of the greater height of the conductor, is not possible, however, with such twisting.

In order also to compensate for this tangential stray field at the overhang winding it is known, in the case of a two-plane bar, to twist the partial conductors, completely through 540° so that the partial conductors at the inlet to the slot and at the outlet of the slot, respectively assume opposing positions with respect to the axis of twist. Thus, the partial conductors are twisted 180° over the first quarter, more than 180° over the second and third quarters and 180° over the fourth quarter of the length of the core slot.

Such twisting is not possible, however, for a three-plane bar, because the compensation of the slot transverse field causes special difficulties and is unattainable by such a twisting of 540° alone in the given sections.

It is accordingly an object of the invention to provide a conductor bar for electrical machines having three planes and provided with a twist pattern by means of which both the radial as well as the tangential stray fields at the conductor overhang ends as well as the slot transverse fields are compensated.

With the foregoing and other objects in view, there is provided in accordance with the invention, a conductor bar for insertion into a core notch of an electrical machine, comprising partial conductors disposed in three longitudinally extending planes, namely a middle plane and two outer planes, the partial conductors being twisted together, and, to compensate for radial and tangential stray fields at overhanging end portions of the bars as well as for the core notch transverse field, the number of partial conductors for each of the planes being uneven, the partial conductors of the outer planes having a twist of 90° over an initial sixth of the length thereof, a twist of 180° over the succeeding second to fifth sixths thereof, and a twist of 90° over the sixth sixth thereof, and being alternatingly stranded together in the middle plane, and the partial conductors of the inner plane in the initial sixth, the second to fifth sixth and the sixth sixth of the length thereof having a doubled twist of 180°, 360° and 180°, respectively.

By means of such twisting, compensation for the tangential and the radial overhang winding stray fields and complete equalization of the core slot transversa field is attained also for a three plane bar.

Although the invention is illustrated and described herein as embodied in conductor bar for electrical machines it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a twisting diagram for a three-plane bar, according to the invention, having five partial conductors in each plane;

FIGS. 2 to 5 are diagrammatic views of the individual partial conductors at various cross-sectional locations of the core slot; and FIG. 6 is a cross-sectional view of a conductor, according to the invention, in the vicinity of the overhang winding, wherein the conductor is formed of hollow and solid partial conductors.

Referring now to the drawing and first, particularly, to FIG. 1 thereof, there is shown therein diagrammatically a conductor bar according to the invention, formed of 15 partial conductors which are disposed five partial conductors apiece in three planes A, B and C, respectively. The positions of the partial conductors in the three planes A, B and C are indicated in FIG. 1 by different lines. Thus, the heavy solid lines in FIG. 1 show the partial conductors in the forward plane A which is labeled with arabic numerals in the cross-section $L_o$ at the beginning of the core slot as shown in FIG. 2; the heavy broken lines show the partial conductors in the middle plane B which is labeled with lower case letters $a$ to $e$ at the beginning of the core slot, i.e., at the cross-section $L_o$, as shown in FIG. 2; and the light solid lines in FIG. 1 show the partial conductors in the rearward plane C thereof which is labeled with Roman numerals I to V at the cross-section $L_o$ as shown in FIG. 2.

The partial conductors 1 to 5 and I to V of the two outer planes A and C, beginning with the plane A, are stranded or braided alternatingly with the partial conductors $a$ to $c$ into the middle plane B. Since all of the partial conductors of the two outer planes A and C pass through the middle plane B, the slope or pitch of the partial conductors in the middle plane B is twice as great as that in the two outer planes A and C.

The entire length of twist of the bar is divided into three sections. The first and last sections, respectively, extend over a sixth and the middle section over four-sixths of the length of twist. The conductors in both outer planes A and C are given a twist of 90° in the respective first and last sections thereof, while the twist of the respective middle section is 180° in the outer planes A and C and 360° in the middle plane B. With respect to the longitudinal division, the spatial slope or pitch of the partial conductors in the middle section, i.e., in the second to fifth sixths, is half as large as that at the ends of the conductor bar.

In FIGS. 2 to 5, the position of the individual partial conductors at different cross-section locations of the core slot is illustrated. As is apparent from FIG. 3, the partial conductors, respectively, according to the outlet position thereof, receive a twist of between 90° and 180° at the location L, i.e., after one-sixth of the slot length.

In the cross-section at the location $L_5$ according to FIG. 4, which is five-sixths of the distance along the length of the slot, the partial conductors have been twisted 360° with respect to the cross-section at the starting location $L_0$. This means that after one cycle or turn, the partial conductors 1 to 5 of the forward plane A have exchanged places with the partial conductors I to V of the rearward plane C, while the partial conductors a to e of the middle plane have returned to their original location.

In the last or sixth sixth of the slot length, the respective partial conductors again receive a twist of 90° in the middle plane, whereby the partial conductors assume a position at the cross-section $L_6$ at the end of the core slot as shown in FIG. 5.

It is noted from FIG. 5 that not all of the partial conductors are twisted 540°, but rather, that only an average of 450° to 540° twist is produced. The overhang stray fields are, in fact, not fully compensated thereby, however the losses produced by the remaining fields aggregate only at most 25 percent of the maximal partial conductor losses of corresponding untwisted bars. It is essential, however, that merely by means of the aforedescribed twisting of the partial conductors, a complete equalization of the transverse field of the core slot is possible. The slot transverse field is compensated or equalized namely when $\int BdF$ over each of the partial conductor loops has zero value, the overstepping of a cross-over location of the partial conductors signifying a change of sign in the integration. In order to meet this condition, the areas over the slot length defined or enclosed by two partial conductors can be added, respectively, to zero if the areas are parallelograms and the positive and negative areas extend, respectively, from the upper edge of the conductor bar to the lower edge thereof.

This equalization or compensation is shown in FIG. 1 by both partial conductors a and 1. In the first sixth, i.e., in the first twisting range, the area F, is enclosed by both partial conductors a and 1 which are assumed to be positive. In the middle range, i.e., in the second to fifth sixth of the slot length, both of these partial conductors a and 1, after passing a mutual cross-over location, enclose an area $F_2$ which is negative, and in the last sixth they enclose an area $F_3$ which is positive since the partial conductors a and 1 have again passed a mutual cross-over location. It should be noted with respect thereto that in the first and last sixths both partial conductors are disposd one over the other in the middle plane thereof and, therefore, the average spacing thereof equals the thickness of the partial conductor, whereas both partial conductors in the second to fifth sixths are disposed in different planes, namely in both outer planes A and C and, consequently, in accordance with the rhythm of the twist, are offset in elevation only about one-half the thickness of a partial conductor, i.e., the average spacing thereof is equal to half the thickness of the partial conductor. Assuming the width of the area for the full partial conductor spacing is 1, the following addition of the areas over the entire core slot length results:

$$1/6 \cdot 1 - 4/6 \cdot \frac{1}{2} + 1/6 \cdot 1 = 0$$

Thus, it is seen therefrom that the sum of all the areas is zero, and the slot transverse field is thereby completely equalized or balanced.

If additional hollow partial conductors traversible by a coolant are to be used in such a conductor bar for cooling purposes, an aggregation of solid or hollow partial conductors, respectively, in one plane must be absolutely avoided. For this reason the hollow partial conductors must be disposed, respectively, in staggered or offset relationship from plane to plane in the region of the overhang winding of the conductor bar which extends out of the core slot.

In FIG. 6, there is shown a cross-sectional view of a conductor bar, according to the invention, having three planes A, B and C in the region of the overhang winding. Clearly seen in this figure is the mutually staggered disposition of the hollow partial conductors 11 between the solid partial conductors 12. The twisting of the conductors 11 and 12 is effected in accordance with the same rhythm described hereinbefore.

I claim:

1. Conductor bar for insertion into a core notch of an electrical machine, comprising partial conductors disposed in three longitudinally extending planes, including a middle plane and two outer planes, said partial conductors being twisted together to compensate for radial and tangential stray fields at overhanging end portions of the bars as well as for the core notch transverse field, the number of partial conductors for each of said planes being uneven, the partial conductors of said outer planes having a twist of 90° over an initial sixth of the length thereof, a twist of 180° over the succeeding second to fifth sixths thereof and a twist of 90° over the sixth sixth thereof, and being alternatingly stranded together in the middle plane, and said partial conductors of said inner plane in said initial sixth, said second to fifth sixth and said sixth sixth of the length thereof having a doubled twist of 180°, 360° and 180°, respectively.

* * * * *